United States Patent [19]
Frechét et al.

[11] Patent Number: 6,011,120
[45] Date of Patent: Jan. 4, 2000

[54] ALKENYL SILANE FUNCTIONALIZATION OF ALKYLSTYRENE HOMOPOLYERS AND COPOLYMERS

[75] Inventors: Jean M. J. Frechét, Oakland, Calif.; Shah A. Haque, Houston; Hsien-Chang Wang, Bellaire, both of Tex.

[73] Assignee: Exxon Chemical Patents, Inc., Baytown, Tex.

[21] Appl. No.: 08/771,001

[22] Filed: Dec. 23, 1996

[51] Int. Cl.[7] .................................................. C08F 8/00
[52] U.S. Cl. ............................................ 525/288; 522/148
[58] Field of Search .............................. 525/288; 522/148

[56] References Cited

U.S. PATENT DOCUMENTS

| | | | |
|---|---|---|---|
| 4,145,490 | 3/1979 | Harris, Jr. et al. | 526/19 |
| 4,864,003 | 9/1989 | Fujimoto et al. | 525/288 |
| 5,162,445 | 11/1992 | Powers et al. | 525/333.4 |

FOREIGN PATENT DOCUMENTS

| | | |
|---|---|---|
| 0 243 124 | 10/1987 | European Pat. Off. . |
| WO 96/36650 | 11/1996 | WIPO . |

OTHER PUBLICATIONS

*Polymeric Materials Science and Engineering (PMSE)*, v.69 (1993)—pp. 426–427—Lochmann, et al "Globular polyethers with "internal" functionalization by metalation of dendrimers and reaction . . .".

*Tetrahedron Letters*, v.32(11) (Mar. 11, 1991)—pp. 1483–1486 –L. Lochmann, et al.—"More Efficient Metallation of Alkylbenzenes by Modified Superbases from Butyllithium and Potassium Alkoxides".

*Macromolecules*, v.19 (1986)—pp. 2903–2908—J.F. Harris, Jr., et al.—"Block and Graft Copolymers of Pivalolactone. 5. Graft Copolymers from Pivalolactone and Isobutylene".

*Journal of Organometallic Chemistry*, v.28 (1971)—pp. 153–158 –L. Lochmann, et al.—"Preparation of Organopotassium Compounds".

*Macromolecules*, v.29(19)—(Sep. 9, 1996)—pp. 6081–6089 –Joachim Steinke, et al.—"Metalation, a Novel Route for the Functionalization of Reactive Elastomers. 1. Superbases in the Metalation of . . .".

*Journal of Organometallic Chemistry*. v. 326 (1987)—pp. 1–7—L. Lochmann, et al.—"Lithium–Potassium Exchange in Alkyllithium/Potassium t–Pentoxide Systems. XIV. Interactions of Alkoxides".

*Polymer Preprints*, v.34(2)—(1993)—pp. 558–559—L. Lochmann, et al.—"A Novel Approach to Graft Copolymers via the Metalation of Polystyrene by Superbase and Reaction with Electrophiles".

*Polymer Preprints*, v.34(1)—(1993)—pp. 548–549—Yaodong Gan, et al.—"Anionic Polymerizations of Trimethylvinyl–Silane and Phenyldimethylvinylsilane Towards the Synthesis of Well–Defined . . .".

*Polymer Journal*, v.24(12)—(1992)—pp. 1409–1417—Jun–ichi Oku, et al.—"Anionic Polymerization of Vinylsilanes V. Isomerization Polymerization of Allylvinylsilanes".

*Primary Examiner*—Bernard Lipman
*Attorney, Agent, or Firm*—Myron B. Kurtzman; Brent M. Peebles

[57] ABSTRACT

There is provided a method of introducing ethylenically unsaturated functionality, into an alkylstyrene homopolymer or copolymer with an isoolefin, at the alkylbenzyl carbon atom comprising the steps of: forming a solution of the polymer in a hydrocarbon solvent; adding to the polymer solution an alkali metal (Na, K, Rb, Cs) alkoxide and an alkyl lithium compound to form a solution of a metalated intermediate; and adding a halodialkylalkenyl silane to the metalated polymer solution. Also provided are the ethylenically unsaturated functionalized polymer derivatives made by the method, and the crosslinked derivatives thereof.

9 Claims, No Drawings

ALKENYL SILANE FUNCTIONALIZATION OF ALKYLSTYRENE HOMOPOLYMERS AND COPOLYMERS

FIELD OF THE INVENTION

This invention relates to homopolymers and copolymers containing alkyl styrene which are metalated using a superbase to provide a metalated intermediate and then functionalized by addition thereto of an electrophilic halosilane reagent.

BACKGROUND OF THE INVENTION

Heretofore, butyl rubber, i.e., copolymers of isobutylene and small amounts of isoprene as a comonomer, and/or halobutyl rubbers, i.e., a halogenated derivative of a butyl rubber, have been used as an elastomer for forming blend compositions with thermoplastic compounds and other elastomer compounds for use in tire production and the like. The butyl and/or halobutyl rubbers impart a number of desirable physical properties to such blends, such as low air permeability, relatively low glass transition temperature (Tg), broad damping peaks, environmental aging resistance, etc. that are significant in the production of tires of superior performance properties. However, various difficulties are encountered with the use of the butyl and/or halobutyl rubbers for this purpose, chief among which is their high incompatibility with most other polymers, including even unsaturated elastomeric compounds to which they have weak adhesion. Hence, that aspect of a butyl rubber that provides properties which make it desirable as a component in blends for tire production, namely the chemical "inertness" that results from the unreactiveness of the hydrocarbon backbone of the butyl rubber polymer, also results in its low reactivity and incompatibility with most other materials and this has limited its use in many areas.

Recently, in U.S. Pat. No. 5,162,445 a unique copolymer of isobutylene has been disclosed together with a procedure for introducing non-backbone functionalities into the copolymer, which well suits it to use as a blend component having all the property advantages of a butyl and or halobutyl rubber, but which overcomes the incompatibility disadvantage of a butyl and/or halobutyl rubber. In its broadest description, the new copolymer is a direct reaction product of an isoolefin having from 4 to 7 carbon atoms with a para-alkylstyrene (PAS); isobutylene (IB) and para-methylstyrene being the preferred monomers; wherein the copolymer has a substantially homogeneous compositional distribution. Derivatives of this IB-PAS copolymer having functionalities that render it compatible and/or cross-linkable with other polymer materials, both thermoplastic and elastomeric polymers, are produced through a halogenated intermediate that is produced by a free radical initiated halogenation of the IB-PAS copolymer.

In U.S. Pat. No. 5,162,445 a preferred copolymer is that of isobutylene and para-methylstyrene and this copolymer is brominated to provide a copolymer having a portion of its para-methylstyrene content brominated at the para-methyl group. The brominated copolymer is essentially a high molecular weight, narrow molecular weight distribution polymer of isobutylene-para-methylstyrene-para-bromomethylstyrene. The benzylic bromine atoms are highly reactive under mild conditions in the presence of a nucleophilic reagent. It was found that a wide variety of functional groups could be introduced at the site of the brominated para-methyl carbon atoms of the pendent phenyl groups to displace at least a portion of the bromine atoms without disruption of the backbone structure or altering the molecular weight and/or molecular weight distribution characteristics of the backbone of the copolymer.

Heretofore, styrenic polymers have reportedly been metalated with lithium by reaction with an alkyl lithium compound activated with N,N,N',N'-tetramethylethylenediamine (TMEDA), and the metalated derivative then converted by reaction with an electrophilic reagent to a variety of functionalized derivatives. Harris et al. U.S. Pat. No. 4,145,490 and *Macromolecules*, 19, 2903–08 (1986) describe the metalation of copolymers of isobutylene with styrene and/or a metalated styrene with lithium as a means of introducing functionality into the copolymer to prepare it for polymerization with pivalolactone. The procedure described by Harris et al. apparently results in introducing functionality into both the primary and tertiary benzylic carbon atoms of a methylated styrene comonomer unit, as well as the aromatic ring carbon atoms thereof. Huge excess of the reagent (alkyl-Li/TMEDA) is required, yet only partial metalation is achieved, and long reaction time are some of the disadvantages associated with the Harris et al. procedure. Hence, it appears that the possible advantage of following the Harris et al. procedure as a means for introducing functionality into the new IB-PAS copolymers disclosed by U.S. Pat. No. 5,162,445 would be achieved at the significant disadvantage of disrupting the hydrocarbon nature of the backbone chain of this copolymer by also introducing lithium at the tertiary benzylic carbon atoms of the copolymer backbone.

Reports have also appeared concerning the combination of an alkyl lithium compound with an alkoxide of a heavier alkali metal to form a reagent, which has been referred to as a "superbase," which is very reactive for performing metalation reactions in organic synthesis and polymer chemistry. The application of a superbase reagent formed from an alkyl lithium and a potassium alkoxide to the metalation of aromatic hydrocarbons like benzene, toluene, ethylbenzene, and cumene to form a metalated species in which the counterion is the heavier alkali metal rather than lithium have been described in articles like *J. Organometalic Chemistry*, 28, 153–158 (1971); *J. Organometalic Chemistry*, 326, 1–7 (1987); *Tetrahedron Letters*, 32, 1483–86 (1991); *Macromolecules*, 29, 6081 (1976).

Even with respect to such simple aromatic molecules, a variety of intermediate metalated products, as deduced from the product resulting from the reaction of the metalated intermediate with methyl iodide, have been reported. In addition to the products whose structures were not determined, the other products of the alkyl Li/K alkoxide superbase metalation reaction comprise structures wherein both an alkyl side chain carbon atom and/or an aromatic ring carbon atom are metalated.

Lochmann et al. in *Ploym. Mat. Sci. Eng.*, 69, 426–7 1993) and *Polymer Preprints*, 34(2), 588–9 (1993) have described the metalation of homopolystyrene and a dendritic polyether with an alkyl Li/potassium tert-pentoxide superbase reagent as a means for introducing functionalities whereby the functionalized polymer materials may then be converted to graft copolymers or multifunctionalized dendrimers of significantly altered properties. It is again reported that main chain metalation—i.e., metalation of the tertiary benzylic carbon atom of the polymer backbone chain—occurs to an even greater extent with an alkyl lithium/potassium tert-pentoxide superbase reagent than that which occurs with an alkyl lithium/TMEDA reagent like that used previously by Harris et al. The metalation of such backbone carbon atoms would disrupt the hydrocarbon nature of the polymer backbone of the new copolymer materials described by U.S. Pat. No. 5,162,445 with potential adverse effects upon its chemical inertness. Further, a significant degree of metalation at aromatic ring carbon atoms is also reported to occur with the alkyl lithium/potassium tert-pentoxide superbase reagent.

It was desirable to devise a way by which to convert the new copolymer materials into functionalized derivatives without altering the inert hydrocarbon structure of the backbone of the copolymer. In earlier applications filed by Frechét et al. U.S. Ser. Nos. 08/659,457, Jun. 6, 1996; 08/476,753, Jun. 7, 1995; 08/447,131, May 22, 1995; and 08/444,951, May 19,1995; the IB-PAS copolymer of U.S. Pat. No. 5,162,445 was effectively metalated and functionalized by adding an electrophile to a solution of the metalated IB-PAS intermediate. Such derivatization of the IB-PAS copolymer worked well for many electrophiles, including chlorotrimethyl-silane, but formed gels or cross-linked materials with certain electrophiles such as allyl bromide.

In the case of the product obtained by reacting allyl bromide with the metalated IB-PAS copolymer, the gel formation is believed to result from a metal-halogen exchange reaction and/or anionic polymerization of the allyl group. Allyl bromide could react with the metalated copolymer to form a brominated copolymer and a metal allyl. The allyl group could anionically polymerize, initiated by the benzylic bromide, or by the superbase reaction conditions.

It is also known that vinyl silane and allyl silane derivatives are subject to anionic polymerizations. See Gam et al., *Polym. Prepr. (Am. Chem. Soc., Div. Polym. Chem.)*, 34(1), 548–9 (1993); Obu et al., *Polym. J.*, 24(12), 1409–17 (1992). Vinyl and allyl silane derivatives would similarly have been expected to form gel under the metalation reaction conditions of U.S. Ser. No. 08/659,457.

It would be desirable to devise a way of introducing vinyl or allyl functionality on the primary benzylic carbon atoms of alkylstyrene polymers, especially on the para-methyl groups of the phenyl groups of the IB-PAS copolymers, without forming gel and without altering the inert hydrocarbon structure of the copolymer backbone.

SUMMARY OF THE INVENTION

This invention provides a method by which an alkylstyrene polymer or copolymer, including the isobutylene-para-alkylstyrene copolymer described in U.S. Pat. No. 5,162,445, may be functionalized at the primary benzylic carbon atom of the alkyl group of the styrenic monomer without significantly altering the backbone micro-structure of the polymer or copolymer, molecular weight or molecular weight distribution or the nature of the aromatic ring carbons of the aromatic group pendent to that polymer or copolymer backbone. The method comprises mixing the alkylstyrene polymer while in solution in a hydrocarbon solvent with a superbase. The superbase is formed by the interaction of an alkyl lithium compound with one or more higher atomic weight alkali metal alkoxides to form a metalated species wherein the counterion is the higher atomic weight alkali metal (Na, K, Rb, Cs) which is localized to the primary benzylic carbon site of the styrenic monomer. It has been found that the desired metalated polymer species is formed very quickly, in a matter of minutes, making it possible to produce the desired metalated polymer species by a continuous flow reaction process. The metalated polymer may be contacted with an electrophilic halodialkyl alkenyl silane reagent to convert the metalated polymer into a derivative having the ethylenically unsaturated functional group covalently bonded via the dialkyl silane to the benzylic carbon atom of the alkyl group of the aromatic group pendent to the polymer backbone.

The conditions of the metalation reaction of the polymer in terms of the mole ratio of the alkyl lithium compound to the mole content of the alkylstyrene units of the polymer, the mole ratio of the heavier alkali metal alkoxide to the alkyl lithium compound and the temperature of the metalation reaction are all selected to minimize the occurrence of the metalation reaction at aromatic ring carbon atom sites while maximizing metalation at the primary benzylic carbon atom sites.

It has been found that the tertiary benzylic carbon atom of the polymer is not metalated (and thereafter functionalized) under the selected reaction conditions and therefore the initial micro-structure of the polymer backbone is preserved in the functionalized derivatives thereof which result as a product of the practice of this method. Further, it has been found that by proper selection of the foregoing conditions, coupled with the choice of superbase cation (Na, K, Rb, or Cs), that the metalation of aromatic ring carbon sites can be reduced to an amount which is insignificant and/or essentially eliminated, thus reducing or eliminating the introduction of functionalities at these sites in the final product. Still further, it has been found that, with reference to the para-alkylstyrene content of the polymer, the degree of metalation and hence functionalization can be accomplished to any extent desired, up to essentially one hundred percent if desired. It has been found that the metalation reaction can be carried to its optimum extent in terms of completeness and specificity for reaction with the metalated benzylic site compared to aromatic metalated sites in a relatively brief period, generally less than 10 minutes, and without need for use of a substantial excess of the superbase reagents. In addition to permitting production of the metalated polymer by a continuous flow reaction process, this also permits use of smaller quantities of halosilane reagents for the treatment in situ of the metalated polymer to convert it to an unsaturation functionalized polymer product. Alternatively, the metalated polymer can be recovered and at a later time treated under proper conditions with the halosilane reagent. Also, since the unsaturation functionality incorporated into the polymer via the metalated polymer is introduced through the use of halodialkylsilane reagent, it is now possible to introduce ethylenically unsaturated functional groups into isobutylene-para-alkylstyrene copolymers essentially without the formation of gel.

Accordingly, there is provided in one embodiment a method for introducing ethylenically unsaturated functionality into an alkylstyrene polymer, preferably a copolymer of an isoolefin and an alkylstyrene, predominantly at the primary benzyl carbon atom, the method comprising the steps of: forming a solution of the polymer in a hydrocarbon solvent; adding to the polymer solution an alkali metal alkoxide and an alkyl lithium compound to form a solution of a metalated intermediate; adding halodialkylalkenyl silane to the metalated intermediate solution to form an alkenyl silane derivative of the polymer. The halodialkylalkenyl silane preferably has the formula $X-Si(R_1)(R_2)(R_3)$ wherein X is halogen, $R_1$ is an ethylenically unsaturated alkyl of from 2 to about 30 carbon atoms, and $R_2$ and $R_3$ are independently hydrocarbyl groups of from 1 to 30 carbon atoms.

The method can also include the step of irradiating the alkenyl silane derivative, or curing the alkenyl silane derivative in the presence of a noble metal catalyst, to effect cross-linking thereof.

There is also provided a novel homopolymer or random copolymer represented by the empirical formula:

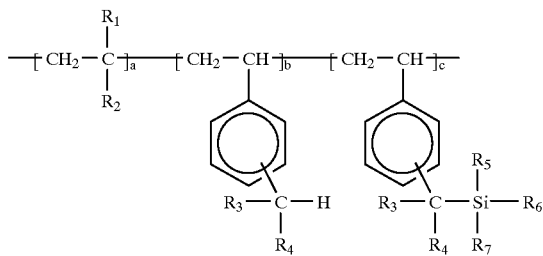

wherein "a" is in the range of 1 to 70,000, "b" is in the range of 0 to 7,000, and "c" is in the range of 1 to 7,000, preferably a>b+c, $R_1$ and $R_2$ are independently $C_1$–$C_5$ alkyl groups; $R_3$ and $R_4$ are independently hydrogen or a $C_1$–$C_4$ alkyl group; $R_5$ is alkenyl of from 2 to about 30 carbon atoms, preferably vinyl or allyl, and $R_6$ and $R_7$ are independently alkyl or alkenyl of up to about 30 carbon atoms.

There is also provided a novel random copolymer represented by the empirical formula:

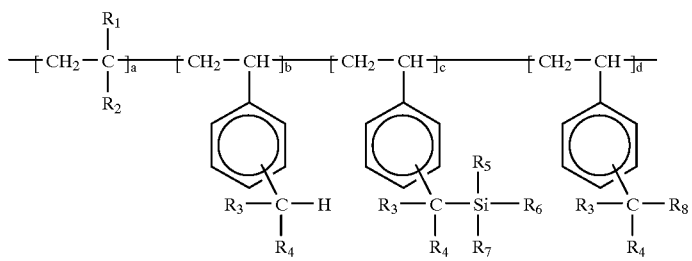

wherein "a" is in the range of 1 to 70,000, "b" is in the range of 0 to 70,000, "c" is in the range of 1 to 70,000, and "d" is in the range of 1 to 70,000, preferably a>b+c+d, $R_1$ and $R_2$ are independently $C_1$–$C_5$ alkyl groups, $R_3$ and $R_4$ are independently hydrogen or $C_1$–$C_4$ alkyl groups, $R_5$ is alkenyl of from 2 to about 30 carbon atoms, preferably vinyl or allyl, $R_6$ and $R_7$ are independently alkyl or alkenyl of up to about 30 carbon atoms, and $R_8$ is carboxyl carboxy- or hydroxy-substituted alkyl of up to about 30 carbon atoms, preferably $C_1$–$C_5$ carboxyalkyl or hydroxyalkyl.

Preferably the alkali metal is one of sodium, potassium, or cesium. Also preferably the alkylstyrene is para-alkylstyrene. In metalating, a small amount of metalation occurs on the aromatic ring. Preferably the benzylic metalation is greater than 60% and the ring metalation is less than 10%, more preferably the benzylic metalation is greater than 80% and the ring's metalation is less than 5%. In another embodiment the benzylic metalation is greater than 50%, preferably greater than 90%, preferably the ring metalation is less than 10%, more preferably less than 5%, and most preferably less than 3%.

DETAILED DESCRIPTION OF THE INVENTION

The preferred alkylstyrene polymers that are suitable for the metalation-functionalization process of the method of this invention are the monoisoolefin-para-alkylstyrene copolymers as described in U.S. Pat. No. 5,162,445, the disclosure of which is hereby incorporated by reference as if fully set forth and described herein. Those copolymers of particular interest and hence the preferred copolymers are those of isobutylene (IB) and para-alkylstyrene (PAS) and particularly those of isobutylene and para-methylstyrene (PMS), which may hereafter be referred to as an IB-PMS copolymer. Of these IB-PMS copolymers, the most preferred are the IB-PMS copolymers that exhibit elastomeric properties, these generally having a weight percent content of IB monomeric units of from about 99.5 to about 50 and a PMS monomeric content of from about 0.5 to about 50 weight percent. Generally, the elastomeric IB-PMS copolymers have a number average molecular weight ($M_n$) of 500 or greater, preferably of 25,000 or greater, ranging up to about 2,000,000 and their molecular weight distribution ($M_w/M_n$) is less than 6.0, preferably less than 4.0, and most preferably less than 2.5.

The functionalized alkylstyrene homopolymers and copolymers can be cured via hydrosilane reaction using a noble metal catalyst such as a platinum catalyst like $H_2PtCl_6$, for example. The functionalized alkylstyrene homopolymers and copolymers can also be crosslinked by irradiation, with or without a photocatalyst. These crosslinked materials are useful as coatings, adhesives or the like. For example, the homopolymers and copolymers can be used to treat fabrics to improve moisture absorption, release properties and thermal regulative properties of fabrics to make clothing made from the fabric more comfortable. The homopolymers and copolymers can also be used as degreasing agents; as prepolymers for ceramics; as denaturants for various polymers; as raw materials for interpenetrating networks; as surface processing agents; as photoresists with good dry-etch resistance; and the like.

The IB-PMS elastomeric copolymers, when functionalized in accordance with this invention, are especially useful and desired as compounded rubber compositions and as blending components for the formulation of blend compositions with other thermoplastic and/or elastomeric polymers used in the production of carcass, side wall, tread and other components of pneumatic tires having superior performance properties. The functionalized IB-PMS elastomeric copolymers can also be used as adhesives, coatings, surface treatments and the like.

The Superbase Metalation Reagent

The reagent used to treat the IB-PMS copolymer to form its metalated counterpart is the product obtained by reaction of an alkyl lithium compound (AkLi) and an alkoxide (AkOM) of one or more of a heavier alkali metal (M is one of Na, K, Rb or Cs) while both are in a neutral, non-polar hydrocarbon solvent.

The Alkyl Lithium Compound

One criterion for the selection of the alkyl lithium compound used to form the superbase is to select one wherein the alkane analogue of the alkyl lithium compound would have a $pK_a$ value that is greater than the $pK_a$ value of the C—H bond of a primary benzylic carbon atom.

The Alkali Metal Alkoxide Compound

The heavier alkali metal alkoxide reagent may be prepared by reacting sodium (Na), potassium (K) rubidium (Rb) or cesium (Cs) metal or mixtures thereof with an alkanol in a nonpolar solvent. The alkoxy structure (AkO) of the alkali metal alkoxide reagent then corresponds to the alkanol (AkOH) from which it was prepared. Among the alkali metal alkoxide reagents that are suitable for practice of this invention are those resulting from the reaction of an alkali metal with isopropanol, sec-butanol, tert-butanol, 2-pentanol, 3-pentanol, tert-pentanol, 3-methyl-3-pentanol, 2-hexanol, 3-hexanol, 2-methyl-2-hexanol, 2-heptanol, 3-heptanol, I(–)-menthol, heptanol, 3-methyl-3-hexanol, 2-ethyl-2-hexanol, 3-ethyl-3-hexanol, 2-propyl-2-pentanol, 2-isopropyl-2-pentanol, 3-propyl-3-pentanol, 3-isopropyl-3-pentanol, methanol, and the like. Generally, for purposes of convenience of workup, it is preferred to use an alkali metal alkoxide reagent, and an alkanol precursor thereof, which are soluble in a hyrocarbon medium. The alkali metal alkoxide reagents most preferred are the alkali metal reaction products of 2-ethyl-2-hexanol (2EtHexOH), menthol (MenOH), and tertiary pentanol (t-PeOH).

Superbase Formation

Solvents which may be employed for the formation of the alkyl lithium, alkali metal alkoxide, and/or the superbase which results from the interaction therebetween are neutral non-polar liquids, such as, and preferably, hydrocarbon solvents that have boiling points from about 0° C. to about 200° C. When appropriate, higher or lower temperatures can be employed. The hydrocarbon solvent may be an aliphatic or cycloaliphatic hydrocarbon and preferably is a hydrocarbon in which the IB-PMS copolymer is soluble to at least the extent of about 2 weight percent. Among the suitable solvents, preferred solvents include pentane, n-hexane, heptane, octane, decane, cyclohexane, methylcyclohexane, and the like.

The superbase reagent may be formed separately from the polymer solution to which it is later added or it may be formed in situ in the polymer solution by adding the alkyl lithium and alkali metal alkoxide compounds to the polymer solution. When formed in situ in the polymer solution it is preferred to first add the alkali metal alkoxide and thereafter to add the alkyl lithium compound. The molar amount of superbase will be equal to the molar amount of alkyl lithium employed in its preparation.

Reaction Conditions for Metalation

With respect to the extent that the alkyl benzylic carbon atom as compared to the aromatic ring carbon atoms of the styrenic unit of the IB-PAS copolymer are metalated, the following reaction parameters have been observed to exert a significant influence on the course and nature of the reaction: (1) the mole ratio of the superbase compound to the styrenic comonomer content of the copolymer; (2) the mole ratio of the alkyl lithium compound to the alkali metal alkoxide compound used to prepare the superbase; (3) the nature of the alkali metal atom (M) used for the superbase; (4) the temperature of the polymer solution during the metalation reaction; (5) the nature of the alkyl moiety of the alkyl lithium compound selected for preparation of the superbase; and (6) the mixing conditions under which the metalation reaction is carried out. With proper choice of conditions the metalation reaction may proceed to the extent of essentially total metalation of the styrene content of the copolymer. Reaction of the tertiary benzylic carbon atom—i.e., the benzylic atom in the polymer backbone chain—either does not occur or occurs to such a small extent as to be essentially undetectable by standard $^1H$ and $^{13}C$ NMR analysis methods.

The mole ratio of superbase to the copolymers comprising para-alkylstyrene can range from about 1 to about 2, with 2.0 being preferred. Amounts of alkyl lithium in a mole ratio to the styrenic comonomer content of greater than 2.0 may be employed. Generally, amounts of the superbase that exceed the 2:1 ratio may not be desirable since such amounts would increase the amount of nucleophilic silane reagent needed to treat the in situ metalated copolymer to convert it to an unsaturation-functionalized product. The amount of alkali metal alkoxide used in preparing the superbase reagent may range as a mole ratio to the amount of the alkyl lithium used from about 1 to about 5, preferably from about 1.1 to about 3.0, and more preferably at or about 3.0. Generally, it is preferred to employ an excess of alkali metal alkoxide relative to the alkyl lithium, with a mole ratio of alkali metal alkoxide to alkyl lithium of about 3:1 being preferred for the preparation of the superbase. Within these ranges the greater degree of metalation with the greatest degree of specificity at the primary benzylic position compared to aromatic carbon sites occurs, wherein the mole rations of AkLi/AkOM/styrenic comonomer content is in the order of 2/6/1.

Further, when the alkyl lithium and alkali metal alkoxide compounds are employed in the amounts as preferred, the greatest degree of metalation of the benzylic carbon site of the para-alkyl group of the styrenic comonomer with the greatest degree of specificity compared to the aromatic carbon sites occurs when the alkali metal of the alkali metal alkoxide reagent is cesium (Cs), next to which is potassium (K), and least preferred is sodium (Na). Further, within the content of the preferred Cs and K alkoxides, the greatest degree of specific metalation of the benzylic carbon site of the para-alkyl group of the styrenic comonomer unit is realized when the alkyl lithium reagent is one wherein the Li atom is associated to a secondary carbon atom of the alkyl moiety rather than a tertiary carbon atom.

Preferred superbases for metalation of an isobutylene-para-alkylstyrene copolymer are those of s-butyl lithium and either t-PeOK or I(–)-MenOCs. The most preferred is I(–)-MenOCs. Within this metalation system the metalation reaction proceeds over a broad temperature range which extends from just above the freezing point of the solvent utilized to just below the boiling point of the solvent. The extent and specificity to which the metalation reaction proceeds does not appear to be dramatically affected by the temperature at which it is conducted. The metalation reaction is preferably conducted at a temperature between –78° C. and 65° C., desirably 20–50° C., more preferably at about room temperature—i.e., about 20–25° C.

The metalation reaction proceeds relatively quickly, with times typically ranging on the order of minutes, such as from about 2 to 30 minutes, and preferably about 15 minutes, being the time within which the reaction proceeds to the optimum extent. Reaction times longer than 60 minutes are not required and may in some instances degrade the quality of the resulting product from the optimum that is otherwise achieved by a shorter reaction time.

Functionalization of the Metalated Product

The halodialkylalkenyl silane, and any other electrophilic reagent, neat or in solution, are added to the solution containing the metalated isoolefin, para-alkylstyrene copolymer to convert it to the product with the pendent alkenyldialkyl silane moieties.

The halodialkylalkenyl silane has the general formula $X-Si(R_1)(R_2)(R_3)$ wherein X is halogen, preferably chlorine or bromine; and $R_1$, $R_2$ and $R_3$ are hydrocarbyl groups of up to 30 carbon atoms, at least one of which has ethylenic unsaturation. $R_1$ is preferably alkene such as vinyl or allyl, and $R_2$ and $R_3$ are preferably alkyl of from 1 to 4 carbon atoms, such as, for example, methyl ethyl, propyl, butyl or the like. Specific representative examples of the silane reactant include chlorodimethylvinyl silane, chlorodimethylallyl silane, chlorodimethylbuta-1,3-dienyl silane and the like.

Additional electrophilic reagent(s) may be included with the silane reactant, or be reacted with the metalated intermediate stepwise, either before or after the silane reactant. An electrophilic reagent is one capable of reacting with a metalated polymer either by addition (as in the case of $CO_2$) or by displacement (as in the case of alkyl halide).

Further examples of electrophiles capable of reaction by addition are ethylene oxide, ethylene sulfides, ketones, aldehydes, esters, cyclic alkylene sulfides, and the like, isocyanates and the like. Further examples of electrophiles capable of reaction by displacement include acyl halides, trialkylsilyl chloride, sulfonyl halides, and the like.

The electrophilic reagent adds to the benzylic carbon atoms of the para-alkyl group to itself form the functional group of the product composition—as in the case of carbon dioxide to form a carboxylic acid functional group or dimethylcarbonate to form a methyl carboxylate functional group—or carry a preexisting functional group into the product composition—as in the case of chlorodimethylvinyl silane to form a silyl-2,2-dimethyl-2-vinyl-methyl pendent group.

The composition resulting from reaction of a metalated copolymer of an isoolefin and a para-alkylstyrene with a halodialkylalkenyl silane reagent is a new copolymer or tetrapolymer. When the copolymer is metalated to less than the full extent of its para-alkylstyrene comonomer content, then the product resulting from its reaction with the silane reagent is a terpolymer of isoolefin-para-alkylstyrene-para-dialkylsilaalkenyl-styrene, wherein the term "para-dialkylsilaalkenyl-styrene" is intended to mean the comonomer composition which results from the reaction of a metalated para-alkylstyrene comonomer with the electrophilic silane reagent. Although we have described the invention with regard to the alkylstyrene being para-alkyl, meta-alkyl and/or ortho-alkyl can also be employed.

These polymers are used in tires, production of polymer blends, in production of engineering plastic blends, in the formation of air barriers and in the production of adhesive and sealant materials, coatings, mechanically molded goods, fabric treatment, degreasing agents, ceramic prepolymers, denaturants, and photoresists. Furthermore, low molecular weight material may be used as additives for oils and other oligomeric fluids after functionalization via metalation.

EXAMPLE 1

Purified and vacuum-dried isobutylene-para-methylstyrene copolymer was dissolved in dry cyclohexane, and the homogeneous solution was stirred. The concentration of polymer in this solution was 5 grams per 60 ml (8.33% wt/vol). The solution was cooled to room temperature, maintained under an argon atmosphere, and 56 ml of an approximately 0.35 molar solution of potassium-tert-pentoxide in cyclohexane was added, about 2 mole equivalents of pendent para-methyl groups, at room temperature. After addition of the alkali metal alkoxide, 6 ml of an approximately 1.3 molar solution of sec-butyl lithium in cyclohexane was added. The color of the solution changed almost instantaneously from colorless to deep red. The reaction was allowed to proceed for 15–20 minutes. Then 6 ml of neat chlorodimethylvinyl silane was added, approximately 1.5 equivalents of the total base.

After quenching, 2–3 ml of water were added immediately. The mixture was transferred to a separating funnel, washed thoroughly with water, and then with acetone/water (80/20 v/v), to completely remove any impurities. The solution was concentrated to about $\frac{2}{3}$ volume and precipitated into acetone. The product was dried under vacuum at 70–80° C. for one day, and characterized by $^1H$ NMR and GPC. Functional conversion was about $\frac{1}{3}$ of the total para-methyl groups.

The starting IB-PMS copolymer was about 87.4 mole percent IB and 12.6 mole percent PMS by $^1H$ NMR; with Mn of 5640, Mw of 12,100 and MWD 2.14 by GPC. Following metalation and silylation, the vinylsilane derivative was about 87.4 mole percent IB, 7.8 mole percent PMS, and 4.8 mole percent para-silyl-(2,2-dimethyl-2-vinyl) methylstyrene by $^1H$ NMR; with Mn of 7480, Mw of 19,1000 and MWD 2.55 by GPC. From the $^1H$ NMR data, the same result is obtained regardless if the silane/PMS ratio is calculated from the integral ratio of benylic-$CH_3$ and phenyl ring, or from the integral ratio of dimethylsilyl and phenyl ring. Also, the integral ratios of benzylic-$CH_2$, silyl dimethyl and silyl vinyl match well, suggesting that there is no crosslinking during the reaction.

These NMR data indicate that the reactive vinyl group remains intact in the quenching reaction of the metalated intermediate. Although vinyl groups are sensitive to anionic polymerization, they were well-preserved in this example. The slight increases in molecular weight are probably due to the loss of small amounts of low molecular weight fractions during washing, precipitation and recovery of the product. The product was gel-free.

EXAMPLE 2

The procedure of Example 1 was similarly followed using chlorodimethylallyl silane instead of the vinyl homolog. About 57 percent of the para-methyl groups were converted to the corresponding allylsilane derivative para-silyl-(2,2-dimethyl-2-allyl): Based on the benzylic methyl/silyl dimethyl integral ratios from $^1$H NMR, the conversion was 56.8 percent; based on the allyl proton/phenyl proton integral ratio, 57.1 percent. No evidence of cross-linking was seen in the GPC results, Mn 7370, Mw 15,700, MWD 2.09.

EXAMPLE 3

The procedure of Examples 1–2 is similarly followed, except that $CO_2$ gas is bubbled through the metalated intermediate solution to react with about half of the metalated methylstyrene moieties, and then half of the previous quantity of the chlorodimethylvinyl silane or chlorodimethlylallyl silane solution is added. The resulting copolymer contains both carboxylic acid and vinyl or allyl functionality on the methyl groups of the para-methylstyrene, i.e. tetrapolymer of IB, PMS, PMS—COOH and PMS—$SiMe_2CHCH_2$ or PMS—$SiMe_2CH_2CHCH_2$.

EXAMPLE 4

Example 3 is repeated, but with ethylene oxide gas instead of $CO_2$. The resulting tetrapolymers are IB/PMS/PMS—EtOH/PMS—$SiMe_2CH_2CHCH_2$ and IB/PMS/PMS—EtOH/PMS—$SiMe_2CHCH_2$.

EXAMPLE 5

Example 3 is repeated, but with formaldehyde gas instead of $CO_2$. The resulting tetrapolymers are IB/PMS/PMS—MeOH/PMS—$SiMe_2CHCH_2$ and IB/PMS/PMS—MeOH/PMS—$SiMe_2CH_2CHCH_2$.

COMPARATIVE EXAMPLE

The procedure of Examples 1 and 2 was similarly followed using allyl bromide instead of the silane compound. The resulting product formed a gel, and the GPC showed a bimodal MWD indicative of crosslinking and/or allyl polymerization.

We claim:

1. A method for introducing ethylenically unsaturated functionality into a polymer of an alkylstyrene at the primary benzylic carbon atom, comprising the steps of:
   forming a solution of the polymer in a hydrocarbon solvent;
   adding to the polymer solution an alkali metal alkoxide and an alkyl lithium compound to form a solution of a metalated intermediate;
   adding halodialkylalkenyl silane to the intermediate solution to form an alkenyl silane derivative of the polymer.
2. The method of claim 1, wherein the halodialkylalkenyl silane has the formula:

$$X—Si(R_1)(R_2)(R_3)$$

wherein X is halogen, $R_1$ is an ethylenically unsaturated alkyl of from 2 to about 30 carbon atoms, and $R_2$ and $R_3$ are independently hydrocarbyl groups of from 1 to about 30 carbon atoms.

3. The method of claim 1, wherein the alkystyrene polymer comprises a copolymer of an isoolefin and an alkylstyrene.

4. A method of crosslinking a polymer represented by the formula:

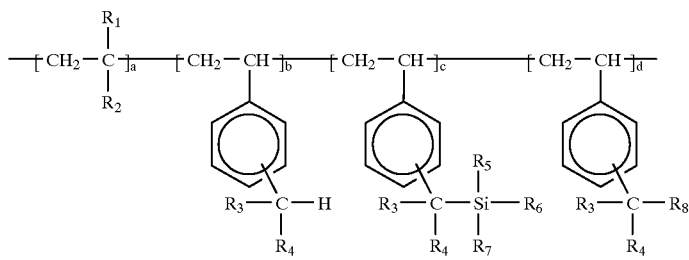

wherein a is in the range from 1 to 70,000, b is in the range from 0 to 7,000, and c is in the range from 1 to 7,000, $R_1$ and $R_2$ are independently alkyl of from 1 to 5 carbon atoms, $R_3$ and $R_4$ are independently hydrogen or alkyl of from 1 to 4 carbon atoms, $R_5$ is alkenyl of from 2 to about 30 carbon atoms, and $R_6$ and $R_7$ are independently alkyl or alkenyl of up to about 30 carbon atoms comprising irradiating said polymer or said polymer in the presence of a noble metal catalyst to obtain the crosslinked polymer.

5. A photoresist formed by the method of claim 4.

6. A composition comprising a homopolymer or random copolymer having the formula:

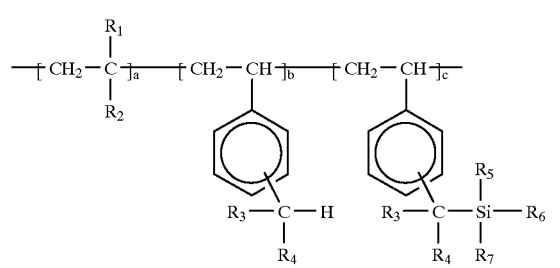

wherein a is in the range from 1 to 70,000, b is in the range from 0 to 7,000, and c is in the range from 1 to 7,000, $R_1$ and $R_2$ are independently alkyl of from 1 to 5 carbon atoms, $R_3$ and $R_4$ are independently hydrogen or alkyl of from 1 to 4 carbon atoms, $R_5$ is alkenyl of from 2 to about 30 carbon atoms, and $R_6$ and $R_7$ are independently alkyl or alkenyl of up to about 30 carbon atoms.

7. The composition of claim 6 wherein $R_5$ is vinyl or alklyl.

8. The composition of claim 7 wherein $R_3$ and $R_4$ are hydrogen and $R_6$ and $R_7$ are methyl.

9. The crosslinked product obtained by irradiating or curing the composition of claim 6 in the presence of a noble metal catalyst.

* * * * *